April 17, 1962  L. OKNER  3,029,697
TEMPLE HINGE FOR SPECTACLE FRAMES
Filed May 5, 1960
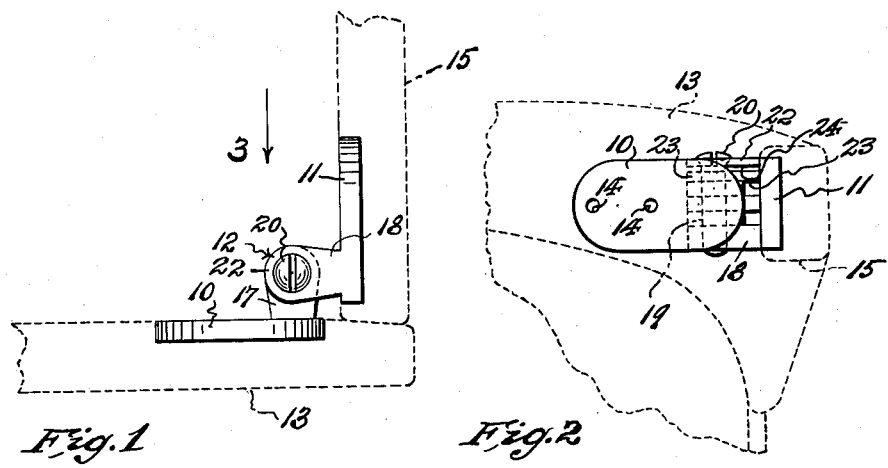
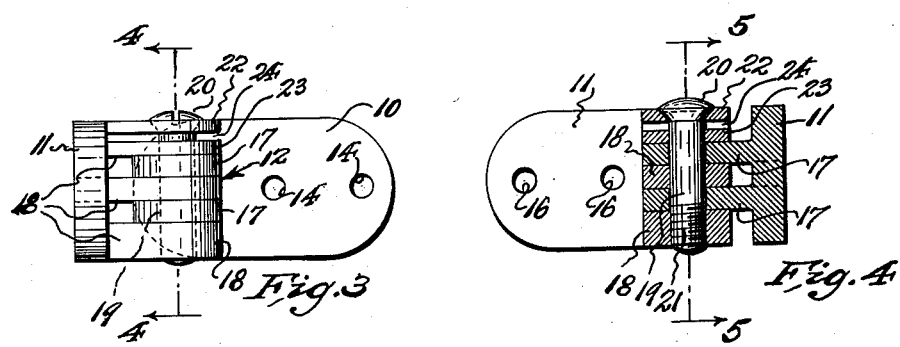
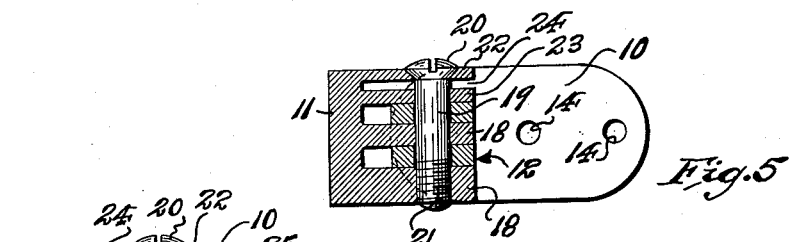
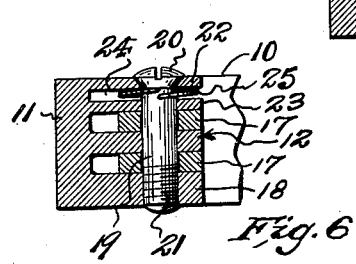
INVENTOR
Luke Okner,
BY Richards & Cifelli,
Attorneys United States Patent Office 3,029,697
Patented Apr. 17, 1962

3,029,697
TEMPLE HINGE FOR SPECTACLE FRAMES
Luke Okner, Irvington, N.J., assignor to Standard Optical Mfg. Company, Livington, N.J., a corporation of New Jersey
Filed May 5, 1960, Ser. No. 27,095
5 Claims. (Cl. 88—53)

This invention relates to improvements in a hinge structure for pivotally connecting a temple to the front or frame of eye glasses of the spectacle type, and, more particularly, to spectacle frames formed, in whole or in part, from plastic material.

In the use of spectacle frame structures, problems have been observed with respect to the hinging of temples to the fronts of such frame structures. These problems include the tendency of hinge pivoting screws to loosen or back out under swinging movements applied to the temples, and the difficulty of overcoming tendency of a temple to loosen so as to permit objectionable too free swaying or swinging movement thereof relative to a frame structure front.

Having these problems in view, it is an object of this invention to provide a novel hinge structure which effectively overcomes either tendency of the hinge pivoting screw to loosen or the connection of a temple to the frame front to become, either through wear of interengaged elements of the hinge or by loosening of the pivot screw, so loose that objectionable too free swaying or swinging of the temple relative to the frame front occurs.

The above and other objects of this invention, not at this time more particularly enumerated, will be understood from a reading of the following description of illustrative embodiments of the invention in connection with accompanying drawings thereof, in which:

FIG. 1 is a top edge view of a hinge structure according to this invention as operatively applied between a temple and the front of a spectacle frame, the latter parts being fragmentarily shown in phantom by broken lines; and FIG. 2 is a front elevational view of the same.

FIG. 3 is an inside elevational view of the hinge structure per se, viewed in the direction of the arrow 3 in FIG. 1, and drawn on an enlarged scale; FIG. 4 is a sectional view of the same, taken on line 4—4 in FIG. 3; and FIG. 5 is another sectional view of the same, taken on line 5—5 in FIG. 4.

FIG. 6 is a fragmentary sectional view, similar to that of FIG. 5, but showing a modified hinge structure according to this invention.

Similar characters of reference are employed in the above described views of the drawings, to indicate corresponding parts.

Referring to said drawings, the hinge structure of this invention comprises a pair of hinge leaves or plates 10 and 11 adapted to be pivotally joined together by an intermediate hinge barrel 12. One of the hinge leaves or plates, e.g. leaf or plate 10, is adapted to be affixed to the back of an end portion of the front 13 of a spectacle frame, as by rivets (not shown), which engage through openings 14 with which said leaf or plate 10 is provided. The other of the hinge leaves or plates, e.g. the leaf or plate 11, is adapted to be affixed to the inside of an inner end portion of a temple 15 of the spectacle frame, also as by rivets (not shown), which engage through openings 16 with which said leaf or plate 11 is provided. The hinge barrel 12 of the hinge structure is thus positioned to pivotally connect the temple 15 to the front 13 of a spectacle frame, as indicated in FIGS. 1 and 2 of the drawings.

The hinge barrel 12 comprises one or more perforate knuckle ears 17 which are integrally formed in connection with one leaf or plate of the hinge structure, e.g. the leaf or plate 10, to project therefrom in horizontal plane at a right angle to the perpendicular plane of said leaf or plate; and a plurality of perforate knuckle ears 18 which are integrally formed in connection with the other leaf or plate of the hinge structure, e.g. the leaf or plate 11, to project therefrom in horizontal plane at a right angle to the perpendicular plane thereof. These knuckle ears are so relatively positioned and spaced apart, that the knuckle ears 17 of the hinge leaf or plate 10 will dovetail into and between the knuckle ears 18 of the hinge leaf or plate 11, when said knuckle ears are operatively assembled in hinge barrel forming relation. When the knuckle ears 17—18 are thus assembled in hinge barrel forming relation a pivot screw 19 is passed, preferably downwardly, through the aligned perforations thereof, thus pivotally joining the hinge leaves or plates one to the other. The pivot screw 19 is provided with an enlarged head 20 to engage, preferably, the upper end portion of the hinge barrel. As shown, the hinge barrel comprises five knuckle ears 17—18, but the same may comprise a lesser number of the latter, e.g. three, or a greater number, e.g. seven or more, according to the size and form of hinge structure desired to be provided in any given case.

In order to retain the pivot screw 19 in place, the perforation of an outermost, preferably the lowermost or bottom external knuckle ear 18, is internally screw-threaded, whereby to be engaged by the external screw threads 21 with which the pivot screw 19 is provided.

An external knuckle ear of the hinge barrel 12, preferably the uppermost or top knuckle ear, is of special form and construction calculated to fulfill the purposes or objects of this invention, and to this end, comprises an outer or upper resilient section 22 and a lower or inner section 23 separated from said outer or upper section by an intervening open space or gap 24. Preferably, the head 20 of the pivot screw 19 is of inverted conical formation adapted to countersink in a conforming conical seat 25, with which said upper resilient section 22 is provided for its reception, thus providing a substantial area of meeting surface contact of said screw head 20 with said resilient section 22 of the hinge barrel 12.

Due to the above novel form and construction of an outer knuckle ear of the hinge barrel 12, when the pivot screw 19 is entered through the hinge barrel and threaded into the opposite outer external knuckle ear of the hinge barrel, the head 20 of the pivot screw engages and exerts inward or downward thrust upon the resilient section 22 of the hinge barrel, thus operating to downwardly deflect said resilient section 22, and therby putting the same in a condition of springy tension. This induced tension causes said resilient section 22 to exert an up-pushing thrust against the pivot screw head 20, and at the same time exerts a downward thrust upon the interjoined knuckle ears of the hinge barrel. The tension of the resilient section 22 also exerts an upward axial drag upon the pivot screw 19. The tensional thrust of the resilient section 22 produces two desirable effects. First, it tends to tighten contact of the knuckle ears of the hinge barrel one with the other, whereby to prevent relative looseness, while at the same time compensating for wear between said knuckle ears, which, if not compensated would result in looseness and consequent objectionable too free swinging of a temple relative to the front of a spectacle frame; and second, the upthrust exerted against the head 20 of the pivot screw 19 by the tensioned section 22 of the hinge barrel, and the accompanying axial up drag imparted to the pivot screw 19, produces a strong frictional engagement between the screw head and an outer end of the hinge barrel 12, and a further strong frictional engagement between the threads of the pivot screw and the internal screw threads of the opposite outer knuckle ear of the hinge barrel, so that a strong resistance to backing out movement or loosening of the pivot screw relative to the hinge barrel is attained.

From the above it will now be understood that the novel hinge structure according to this invention provides an efficient means for avoiding objectionable loosening of the pivoting screw of a hinging connection between a temple and front of a spectacle frame, while, at the same time, compensation for loosening wear, which may occur between the knuckle ears of the hinge barrel, is provided for.

Ordinarily the hinge structure will be produced from a metal of such character as will assure a sufficient degree of elastic resiliency that will provide a sufficient degree of tension with respect to the resilient section of the hinge barrel 12. If, however, the hinge structure is produced from relatively soft metal, e.g. high grade gold or the like, the tensional effect of hinge barrel section 22 may be supplemented and increased by inserting, between said section 22 and the section 23, a resilient or spring washer. This is shown in FIG. 6 of the drawings, in which the said washer is indicated by the reference character 25. This modification is deemed to be within the broad scope of this invention as a desirable modification thereof.

Having now described my invention, I claim.

1. A hinge structure for interposition between the front of a spectacle frame and a temple thereof, whereby to pivotally join the latter to the former, comprising a pair of hinge leaves joined by a hinge barrel formed by interengaged perforate knuckle ears which project from the hinge leaves, a pivot screw having an enlarged head, said screw extending through said hinge barrel into threaded engagement with an outer knuckle ear thereof, the opposite outer knuckle ear of the hinge barrel being divided, in a plane parallel thereto, thereby to provide an external, axially depressible, resilient means comprising an outer resilient section and an inner section spaced away from said resilient section, whereby said resilient means is adapted to be directly engaged by the head of said pivot screw, when the latter is turned home, so as to exert outward axial pressure upon said screw, and induce frictional resistance to loosening of the latter, while at the same time maintaining the knuckle ears of the hinge barrel in tight contact.

2. A hinge structure for interposition between the front of a spectacle frame and a temple thereof, whereby to pivotally join the latter to the former, comprising a pair of hinge leaves joined by a hinge barrel formed by interengaged perforate knuckle ears which project from the hinge leaves, a headed pivot screw extending through said hinge barrel into threaded engagement with an outer knuckle ear thereof, and the opposite outer knuckle ear of the hinge barrel being divided to provide an outer resilient section and an inner section spaced away from said resilient section, the pivot screw head being adapted to directly engage said resilient section, whereby, when the pivot screw is turned home, the screw head will deflect said resilient section to a tensioned condition which exerts axial thrust against the screw head with accompanying axial drag upon the pivot screw, thereby inducing frictional resistance to loosening of the latter, while at the same time maintaining the knuckle ears of the hinge barrel in tight contact.

3. A hinge structure according to claim 2, including a resilient washer interposed between the outer resilient section and the inner section, whereby to enhance the tensional effect of the former.

4. A hinge structure according to claim 2, wherein the pivot screw head is of inverted conical formation, and the resilient section is provided with a conforming conical seat to receive said screw head.

5. A hinge structure according to claim 4, including a resilient washer interposed between the outer resilient section and the inner section, whereby to enhance the tensional effect of the former.

References Cited in the file of this patent

UNITED STATES PATENTS

| | | |
|---|---|---|
| 1,588,807 | Powell et al. | June 15, 1926 |
| 2,567,879 | Fox | Sept. 11, 1951 |
| 2,634,655 | Knowles et al. | Apr. 14, 1953 |
| 2,987,757 | Okner | June 13, 1961 |